United States Patent Office
3,533,286
Patented Oct. 13, 1970

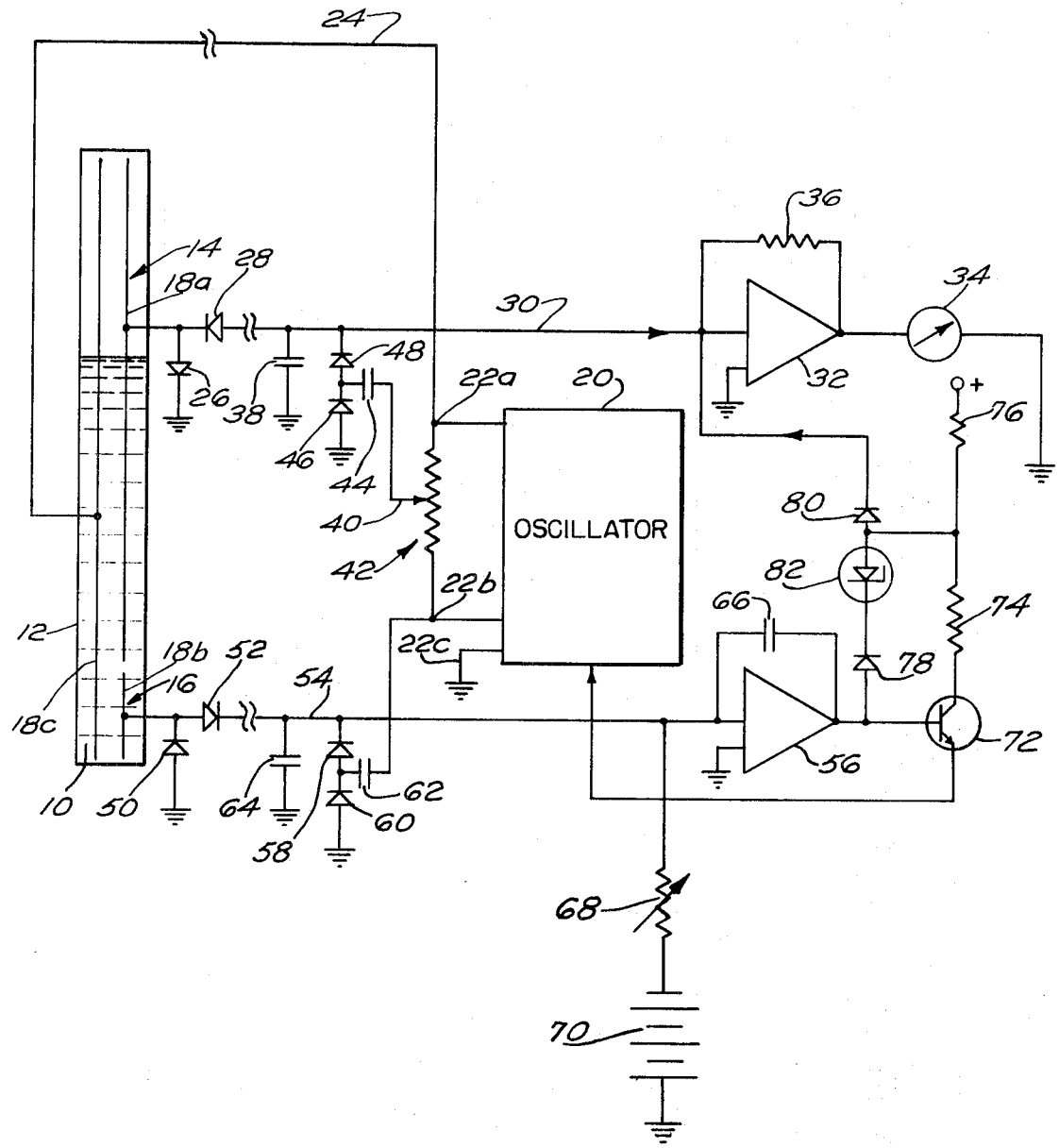

3,533,286
TANK QUANTITY GAGE
Vernon C. Westcott, Lincoln, and Byron E. Blanchard, Lexington, Mass., assignors to Trans-Sonics, Inc., Lexington, Mass.
Filed Jan. 28, 1969, Ser. No. 794,668
Int. Cl. G01f 23/26
U.S. Cl. 73—304       17 Claims

ABSTRACT OF THE DISCLOSURE

A tank quantity gage uses a sensing capacitor driven from an AC source to measure the quantity of liquid in a reservoir such as a fuel or oil tank. A reference capacitor, driven from the same source as the sensing capacitor, is connected to vary the amplitude or frequency of the source voltage in accordance with the current through the reference capacitor so as to compensate for changes in the dielectric constant of the liquid caused by variations in temperature, composition of the liquid, etc. The capacitor outputs are rectified immediately adjacent the capacitors to eliminate the effects of stray capacitance and other signal-degrading mechanisms usually associated with the transmission of these outputs to remote indicating circuitry.

BACKGROUND OF THE INVENTION

Field of the invention

The invention relates to a tank quantity gage. More particularly, it comprises a capacity tank quantity gage compensated for variations in the dielectric constant of the liquid and adapted to transmit sensor outputs long distances over conventional cables without signal degradation.

A capacitive tank quantity gage measures the quantity of a liquid in a tank or reservoir by sensing the capacitance of a sensor formed from a pair of opposed, vertically-oriented electrodes extending down into the liquid. Assuming that the capacitor has the same cross section at all levels, its capacitance is proportional to the quantity of the fluid. An indicator calibrated to indicate volume directly is connected to the sensor by a cable. Gages of this type require no moving parts and are therefore especially useful in applications where safety and reliability are prime requisites. As an example, capacitive tank quantity gages are advantageously used in fuel and oil tanks in aircraft.

Prior Art

Prior aircraft tank quantity gages drive the sensing capacitor (or a bridge circuit containing the capacitor) with an AC voltage and transmit the output current over a coaxial cable to an indicator at a remote location, e.g., in the pilot's compartment. Coaxial cable is used because it isolates the sensing capacitor output from stray pickup during its passage to the indicating circuitry. The remote location of the indicator is often a substantial distance from the tank so that the weight of the coaxial cable is a matter of concern. This is especially a problem in the larger aircraft where the distances involved are of the order of tens of feet and where the liquid levels in a number of tanks must be measured.

In addition to the capacitive current through the sensing capacitor, there is an additional current component due to the conductivity of the liquid. This second component is herein termed a "quadrature" component since its phase differs by 90 degrees from the phase of the capacitive component. In order to provide an accurate measurement of the liquid level, the quadrature component must be separated from the capacitive component.

In prior systems this is done by utilizing a phase-sensitive detector in conjunction with the indicating circuitry. A detector of this type requires a reference signal which is exactly in phase with the capacitive component of the sensing capacitor signal. Since it is difficult to establish and maintain this exact phase relationship, most systems, in practice, have a certain amount of phase misalignment. As a result, they are sensitive to the quadrature component and this introduces error into the measurement.

A capacitive sensor is sensitive to the dielectric constant of the liquid in which it is immersed. Since the dielectric constant changes with changes in temperature, change of fuel or oil type, addition of additives, increases in contaminants, etc., the sensor output departs from its "true" or calibrated value at various liquid levels in response to changes in these parameters. Accordingly, it is necessary to compensate for the variation in dielectric constant to prevent inaccurate readings of the liquid level. Conventional gages often compensate for this by means of a bridge circuit driven by AC and having a reference capacitor immersed in the liquid. This capacitor is incorporated in one arm of the bridge to balance out the change in sensor output caused by the change in the dielectric constant. However, the bridge elements are commonly positioned far from the sensing and reference capacitors and this system therefore suffers from all the problems associated with transmitting an AC signal over a long cable.

BRIEF SUMMARY OF THE INVENTION

Objects

Accordingly, it is an object of the invention to provide an improved capacitive tank quantity gage.

Yet another object of the invention is to provide an improved capacitive tank quantity gage which obviates the need for shielded cable between the sensor and the indicator.

A further object of the invention is to provide an improved capacitive tank quantity indicator which is relatively insensitive to stray pickup.

Still a further object of the invention is to provide a tank quantity gage having a low sensitivity to quadrature components.

Yet another object of the invention is to provide a tank quantity indicator which has simple but effective compensation for changes in the dielectric constant of the liquid whose level is being measured.

Brief description of the invention

Our liquid level gage comprises a conventional capacitive sensor unit located within a tank or reservoir whose liquid quantity is to be measured. This quantity may be liquid level, liquid volume, or liquid mass, dependent on the shape of sensor electrodes and the configuration of the tank. For purposes of illustration, we will describe the invention in terms of liquid level. The sensor unit is connected by a cable to a low-input-impedance indicator at a remote station. The sensor unit comprises a sensing capacitor and a reference capacitor which are connected to a voltage source common to both, for example, to an oscillator whose amplitude or frequency may be varied.

Before transmission to the indicator, the currents through the sensing and reference capacitors are rectified, preferably immediately at the output terminals of the respective capacitors. With this conversion from AC to DC, an ordinary cable can generally be used to carry this output from the sensing station to the indicating station without concern for stray pick-up since the indicator circuit can be made insensitive to AC inputs. Further, due to rectification of the sensing capacitor output, the error due to the presence of the quadrature component is made inversely proportional to the square of the driving frequency instead of to the first power of this frequency. This error can therefore be reduced to a small fraction of that obtained with gaging systems using phase detectors having small errors in the phase of the reference signal.

A feedback circuit controls the oscillator to maintain a constant current through the reference capacitor. The voltage applied to the capacitor is varied according to the dielectric constant of the monitored liquid and specifically it is adjusted to compensate for changes in dielectric constant. Accordingly, the current through the sensing capacitor is a function only of the height of the liquid between its electrodes and is independent of the dielectric constant of the liquid. This eliminates errors that would otherwise arise from variations in dielectric constant due to temperature changes, or changes in the composition of the liquid.

SPECIFIC DESCRIPTION OF THE INVENTION

The foregoing and further objects, advantages and features of the invention will be more readily apparent on reference to the single figure of the drawing which is a schematic diagram of a preferred embodiment of the fluid level indicator of the present invention.

In the drawing, a liquid 10 whose level is to be measured in contained in a tank 12 in which a sensing capacitor 14 and a reference capacitor 16 are located. The sensing capacitor 14 and the reference capacitor 16 are formed from electrodes 18a and 18b respectively, together with a common electrode 18c. The reference capacitor 16 is located at the bottom of the tank so that it is fully immersed at all times. The sensing capacitor 14 is vertically oriented in the tank so that the liquid 16 rises between its electrodes as the liquid level rises.

The capacitors 14 and 16 are driven from an oscillator 20 having output terminals 22a, 22b and 22c, one of which is connected to the electrode 18c via a cable 24. The current through the capacitor 14, which is a function of its capacitance $C_s$, is rectified by diodes 6 and 28 and is then transmitted over a cable 30 to an indicating circuit comprising a high gain DC amplifier 32 which drives a DC meter 34. A resistor 36 provides negative feedback from the amplifier output to its input so that the amplifier presents a low input impedance to signals applied to it. A capacitor 38 bypasses stray AC pickup appearing on the cable 30.

Capacitor 14 and diodes 26, 28 supply to the indicator circuit a DC current whose magnitude is a function of the capacitance $C_s$ of the capacitor 14 and thus of the level of the liquid between its electrodes. Since meter 34 is responsive only to DC signals, it does not respond to any stray AC pickup which may be added to the DC signal during its transmission along the cable 30. Thus, after rectification, the output of the capacitor 14 may be transmitted over a conventional, unshielded cable 30 (as opposed to a coaxial cable or one with heavy shielding) without interference from stray AC pickup. This leads to a significant saving in weight.

Further, rectification of the sensing-capacitor current prior to its measurement leads to a quadrature error which depends inversely on the square of the frequency instead of on its first power as in gages using a phase detector to separate the quadrature component. Indeed, for a voltage drive E Sin $w_1 t$, the average current through capacitor 14 is:

$$I_{av} = -\frac{Ew_1}{\pi} \int_0^\pi \left[ C\frac{d}{dt} + G \right] \sin w_1 t\, dt$$

$$\cong -\frac{E}{\pi} \cdot w_1 C \left[ 1 + \tfrac{1}{2}\left(\frac{G}{w_1 c}\right)^2 \right]$$

whereas the corresponding quantity for a system using a phase-sensitive detector having a small phase error $\phi$ in its reference signal is:

$$\frac{E}{\pi}\left[1+\left(\frac{G}{w_1 c}\right)\phi\right]$$

For a phase error $\phi$ as small as 1° and at a frequency of 1000 Hz., the quadrature errors in these expressions are approximately equal for a typical aircraft fuel having a $$\left(\frac{G}{w_1 c}\right) \cong .04$$

Above 1000 Hz., the error for the present gage decreases as the square of the frequency. At 8000 Hz., which is the preferred driving frequency in the present gage, the quadrature error is down by a factor of 64 from its value at 1000 Hz., whereas the quadrature error of the phase detector system is down only by a factor of 8 at the higher frequency. Accordingly, as the driving frequency is raised, the quadrature error is reduced much more rapidly with the present system.

To obtain the fullest benefits of our novel gage, the indicating circuitry, which is in series with the sensing capacitor 14, must possess a sufficiently low impedance so that the capacitor 14 can discharge fully through the rectifier diodes 26 and 28 and into the amplifier 32 and meter 34 during each cycle. This means that the time constants of the series RC circuits formed by the indicator circuit input impedance and the sensing capacitor 14, or any other capacitors, including stray capacitance, which may affect the discharge of capacitor 14, must be less than the period of the driving voltage applied to this capacitor. It is also desirable that the driving voltage be relatively large in relation to the forward voltage drop across diodes 26 and 28 so that this linear relation is substantially unaffected by the presence of the diodes.

In some cases the circuit so far described may be entirely adequate for measuring liquid level and may therefore be used without the additional circuitry to be described below. In such cases, the circuit provides a simple inexpensive means of sensing a liquid level and transmitting a signal indicative of the level to a remote location without using heavy or special cable and without encountering signal degradation due to stray pickup on the transmission line.

Generally, however, it will be found desirable to incorporate further features into the gaging system to compensate for the initial or "dry" capacitance of the sensor or for variations in the dielectric constant of the liquid, and these features will now be described in detail.

The liquid level at any instant is proportional to the change in capacitance $\Delta C_s = C_s - C_{s0}$ of the capacitor 14 from its "dry" value, i.e., from its capacitance when there is no liquid between its electrodes. Accordingly, it is necessary to inject into the cable 30 a current whose magnitude is a measure of the "dry" capacitance $C_{s0}$. This is done by feeding a portion of the oscillator output, taken across the terminals 22a and 22b, to an arm 40 of a potentiometer 42 and thence through a capacitor 44 to the common point of diodes 46 and 48. The diodes 46 and 48 rectify this output and inject the rectified output into the cable 30. The position of arm 40 is adjusted so that the magnitude of the current injected into the cable corresponds to the "dry" value $C_{s0}$. Thus, the net current supplied to the amplifier 32 along the cable 30 is an analog of $(C_s - C_{s0})$.

Changes in the dielectric constant of the liquid 10 are compensated for by means of reference capacitor 16. The current through this capacitor, which is proportional to its capacitance $C_r$, is rectified by diodes 50 and 52 and is then applied via a cable 54 to a low-input-impedance DC amplifier 56. A current proportional to the "dry" value $C_{r0}$ of the capacitor 16 is subtracted from the cable 54 by means of diodes 58 and 60 which are connected through capacitor 62 to the oscillator output at terminal 26b. Thus, the net current supplied to the amplifier 56 along the cable 54 is a DC current whose magnitude is an analog of the change in capacitance $(C_r - C_{r0})$ of capacitor 16. A capacitor 64 bypasses to ground stray AC pickup along the cable 54 without affecting the DC input to the amplifier 56.

The amplifier 56 is part of a negative feedback loop which compensates for changes in the dielectric constant of the liquid 10. This amplifier has a capacitor 66 connected in negative feedback relation around it to provide an output proportional to the integral of the input to the amplifier. It also has a variable resistor 68 and a power supply, here shown as a battery 70, connected to its input to establish a reference level for the integration. The output of the amplifier is applied to a transistor 72 which is connected to a power supply via resistors 74 and 76 in its collector circuit. The transistor 72 in turn supplies a control input to the oscillator 20 to control its output in accordance with the driving signal applied to the transistor. The oscillator control is arranged to change the oscillator output in a direction opposite to the change in the output of the capacitor 16. Either the frequency or the amplitude of the output may be varied. Methods of controlling an oscillator to provide an output dependent on a control input are known to those skilled in the art and need not be described in detail.

The output of the capacitor 16 is proportional to its capacitance and therefore to the dielectric constant of the fluid in which it is immersed; as the dielectric constant changes due to changes in temperature, etc., the capacitance of capacitor 16, and therefore its output, change accordingly. As long as the dielectric constant of the liquid 10 remains fixed, the input to the oscillator 20, and therefore its output, also remain fixed. When the dielectric constant of the fluid 16 changes for any reason, the current through the capacitor 16 tends to change accordingly. The resulting change in the output of the amplifier 56 causes the oscillator 20 to adjust its output in such a direction as to maintain the current through the capacitor 16 at its original reference level.

Similar corrective action takes place if the output of the oscillator 20 should change during operation; in this case, the capacitor 16 generates an output which, when fed back as a control input to the oscillator 20, restores the oscillator output and the capacitor current to their previous values. This minimizes the effects of instability in the oscillator.

Since capacitor 14 is driven from the same source as capacitor 16, the current through capacitor 14 is maintained at the value it would have had if the dielectric constant had not changed. The output of sensing capacitor 14 is therefore referenced at all times to the output of reference capacitor 16, so that the current through meter 34 is an analog of $$\left(\frac{C_s - C_{s_0}}{C_r - C_{r_0}}\right)$$

Thus, the system automatically adjusts the drive voltage on capacitor 14 for changes in the dielectric constant of the liquid in the tank 12; the current applied to meter 34 therefore responds only to changes in liquid level and not to changes in dielectric constant.

The zero setting of the meter 34 is adjusted by way of arm 40 of potentiometer 42. This adjusts the magnitude of the current injected into the cable 30 through diode 48 to compensate for the "dry" capacitance $C_{s_0}$. The full-scale setting is adjusted by means of a variable resistor 68 and battery 70 which control the magnitude of the current subtracted from the input to amplifier 56 to establish the reference level for the integration.

A monitoring circuit is also incorporated in the gage system to provide a warning when a malfunctiton in the reference circuit occurs. The monitoring circuit comprises a pair of conventional diodes 78 and 80 are a Zener diode 82 connected between the output of amplifier 56 and the input of amplifier 32. When a malfunction occurs, for example, a break in the cable 54, the input to amplifier 56 decreases and its output therefore increases (since it is an inverting amplifier). The increased output breaks down the diode 82 and injects a current into the amplifier 32 to drive the meter 34 to its zero point or below and thereby indicate a malfunction.

So far the invention has been described without specific reference to the placement of the components of the system. The sensor unit comprising the capacitors 14 and 16 is, of course, positioned within the tank to reservoir whose level is to be measured. Further, the diodes 26, 28 and 50, 52 are positioned at, or very closely adjacent the output terminals of these capacitors to minimize the effects of stray capacitance between these diodes and the respective capacitors; as noted previously, the stray capacitance between the diodes and the indicator circuitry has no adverse effects. Most of the remaining components may be positioned at any desired location, either near to, or remote from, the tank. However, the indicator 34 will generally be positioned remote from the tank and it will usually be found convenient to position the remaining components at this remote station also.

From the foregoing it will be seen that we have provided an improved fluid level indicator possessing decided advantageous in weight, cost, and complexity. The indicator utilizes feedback to compensate for changes in the dielectric constant of the fluid whose level is being measured in order that the indicator output may be responsive only to changes in fluid level and not to changes in the dielectric constant.

Problems associated with stray pickup on the cable connecting the sensing capacitor to the indicator are substantially eliminated by immediately rectifying the sensing capacitor output prior to its transmission to the indicator anb dy maintaining the input impedance of the indicator at a low value. This allows the use of conventional cable for signal transmission and obviates the use of coaxial or other types of shielded cable which would normally be required to transmit the capacitor output signal to the indicator.

As a further advantage, our gage system provides a square-law relation for the quadrature so that increasing the sensing capacitor driving frequency above a few thousand Hz causes a greater reduction in the quadrature error than is provided by gage systems using a phase detector. Therefore, the need for a highly-accurate phase detector to reject the quadrature components is eliminated.

We claim:

1. In a capacitive gage having a series circuit comprising a capacitive sensor for immersion in a tank, an AC source for applying an alternating voltage thereto, rectifying means for rectifying the current through said sensor, and an indicator circuit responsive to the current through said sensor to provide an indication of the quantity of liquid in said tank, the improvement which consists of means for compensating said gage for variations in the sensor output due to variations in the dielectric constant of the liquid, said means comprising (A) a reference capacitor for total immersion in said liquid;
(B) means connecting said AC source to said reference capacitor for applying a signal thereto;
(C) rectifying means in series with the reference capacitor; and
(D) control means for varying the output of said source in relation to the current through said reference capacitor to maintain the current through the sensing capacitor independent of the dielectric constant of the liquid.

2. A capacitive gage according to claim 1 in which said control means includes an integrator connected to receive the output of the rectifying means and apply to the driving source a control input whose magnitude varies to maintain the current through the reference capacitor constant.

3. A capacitive gage according to claim 2 which includes a current source connected to the integrator input for establishing a reference level for the integrator.

4. A liquid level indicator for measuring the level of a dielectric liquid in a reservoir, comprising
  (A) a first capacitive sensor for immersion in said liquid and providing an output indicative of the quantity of said liquid in said reservoir;
  (B) a second capacitive sensor for continuous immersion in said liquid and providing an output proportional to the dielectric constant of said liquid;
  (C) means for supplying a controlled alternating voltage to both said sensors;
  (D) means for controlling said voltage in accordance with the output if said second sensor;
  (E) rectifying means in immediate proximity with said first sensor for rectifying the output thereof;
  (F) low-impedance indicating means positioned remote from said rectifying means for providing an indication of the magnitude of the output from said rectifying means; and
  (G) unshielded cable means connecting the rectifying means and the indicating means.

5. A liquid-level indicator according to claim 4 in which the average value of the quadrature component of the input to said indicator depends inversely on the square of the frequency and in which the means for supplying a controlled voltage to said sensors includes an oscillator operating at a frequency in excess of one thousand Hz. whereby the magnitude of the quadrature component is decreased by several orders of magnitude in comparison with its value at frequencies of the order of one hundred Hz.

6. A liquid-level indicator according to claim 5 in which the means for controlling the alternating voltage includes means for varying the amplitude of the oscillator voltage, the amplitude of said voltage being varied in such a direction as to maintain the output current from said second sensor substantially constant, whereby said first sensor output is automatically compensated for changes in the dielectric constant of said fluid.

7. A liquid-level indicator according to claim 4 which includes means for subtracting currents from the outputs of said sensors, said currents being proportional to the currents due to the capacitances of the sensors when said sensors are not immersed in said fluid, whereby outputs proportional to the changes in capacitance caused by immersing the sensors in the fluid are obtained.

8. A liquid-level indicator according to claim 4 which includes first and second low impedance amplifying means for receiving as inputs the outputs of said first and second sensors, said first amplifying means being connected in driving relation with said indicating means, said second amplifying means being connected to said alternating voltage means to control the output thereof in accordance with the output of said second sensor.

9. A liquid-level sensor according to claim 8 which includes means for providing a direct failure indication on substantial change of the input to said second amplifying means, said means comprising current-gating means connected from the output of the second amplifier to the input of the first amplifier to overdrive said indicating means on occurrence of said failure.

10. An oil-level indicator for measuring the level of oil in a reservoir, comprising:
  (A) a sensing capacitor for immersion in said reservoir, said capacitor having opposed electrodes for admission of oil therebetween and providing an output proportional to the level of oil between said electrodes;
  (B) a reference capacitor for continual and total immersion in the oil whose level is to be measured, said capacitor having opposed electrodes between which oil is admitted and providing an output proportional to the dielectric constant of the oil;
  (C) alternating voltage supply means for supplying alternating voltage to both said sensors and including means for controlling the amplitude of said alternating voltage in accordance with the output of said second sensor;
  (D) rectifying means in immediate proximity with at least the sensing capacitor for rectifying the output thereof;
  (E) indicating means positioned remote from said rectifying means for providing an indication of the magnitude of the output from said rectifying means; and
  (F) cable means connectng the rectifying means and the indicating means.

11. An oil-level indicator according to claim 10 in which the rectifying means comprises a plurality of diodes positioned in direct contact with the capacitor whose output is being rectified whereby stray capacitance of electrical leads connecting the output terminals and the rectifying means is minimized.

12. An oil-level indicator according to claim 11 in which rectifying means are positioned in immediate proximity with both the sensing capacitor and the reference capacitor whereby the outputs of said capacitors are converted to DC outputs immediately adjacent said capacitors.

13. An oil-level indicator according to claim 10 in which the oscillator supplies a driving voltage to said capacitors at a frequency of the order of 8000 Hz. whereby the quadrature error of liquids having a conductive component of a magnitude comparable to that of aircraft fuel is reduced to a negligible level in comparison to its magnitude at frequencies of the order of hundreds of Hz.

14. A capacitive gage for providing an output indicative of the quantity of a liquid in a reservoir and for compensating said output for changes in the dielectric constant of the liquid, said gage comprising
  (A) a sensing capacitor immersible in said tank and providing an output which is a function of the quantity of liquid in said tank;
  (B) a reference capacitor providing an output indicative of its capacitance;
  (C) a controllable AC source for applying an AC drive to both said capacitors; and
  (D) control means connected to the reference capacitors for varying the output of said source in accordance with incremental changes in the output of said reference capacitor to maintain the current through said capacitor substantially constant independent of the dielectric constant of the liquid.

15. A capacitive gage according to claim 14 in which said control means includes an integrator connected to said reference capacitor and adapted to supply a control input to the AC source in accordance with the output of the reference capacitor.

16. A capacitive gage according to claim 15 in which said source comprises an oscillator, the amplitude of the oscillator output being varied in response to the control input in such a manner as to maintain the current through the reference capacitor substantially constant.

17. A capactive gage according to claim 14 in which the electrodes of the sensing capacitor are disposed in a vertical position for admission of fluid therebetween and are so shaped as to provide a linear relation between capacitance and liquid level, whereby the current through said sensing capacitor is indicative of the liquid level in said reservor.

References Cited

UNITED STATES PATENTS

| | | | |
|---|---|---|---|
| 3,037,385 | 6/1962 | Franzel et al. | 73—304 |
| 3,111,845 | 11/1963 | Prigozy | 73—304 |
| 3,119,267 | 1/1964 | Bartky | 73—304 |
| 3,208,280 | 9/1965 | Exon | 73—304 |

LOUIS R. PRINCE, Primary Examiner

F. SHOON, Assistant Examiner

U.S. Cl. X.R.

324—61

UNITED STATES PATENT OFFICE
CERTIFICATE OF CORRECTION

Patent No. 3,533,286     Dated October 13, 1970

Inventor(s) Vernon C. Westcott et al.

It is certified that error appears in the above-identified patent and that said Letters Patent are hereby corrected as shown below:

Column 5, line 69, "are" should read -- and --. Column 6, line 6, "to" should read -- or --. Column 7, line 11, "if" should read -- of --.

Signed and sealed this 4th day of May 1971.

(SEAL)
Attest:

EDWARD M. FLETCHER, JR.
Attesting Officer

WILLIAM E. SCHUYLER, JR.
Commissioner of Patents